Patented Oct. 6, 1953

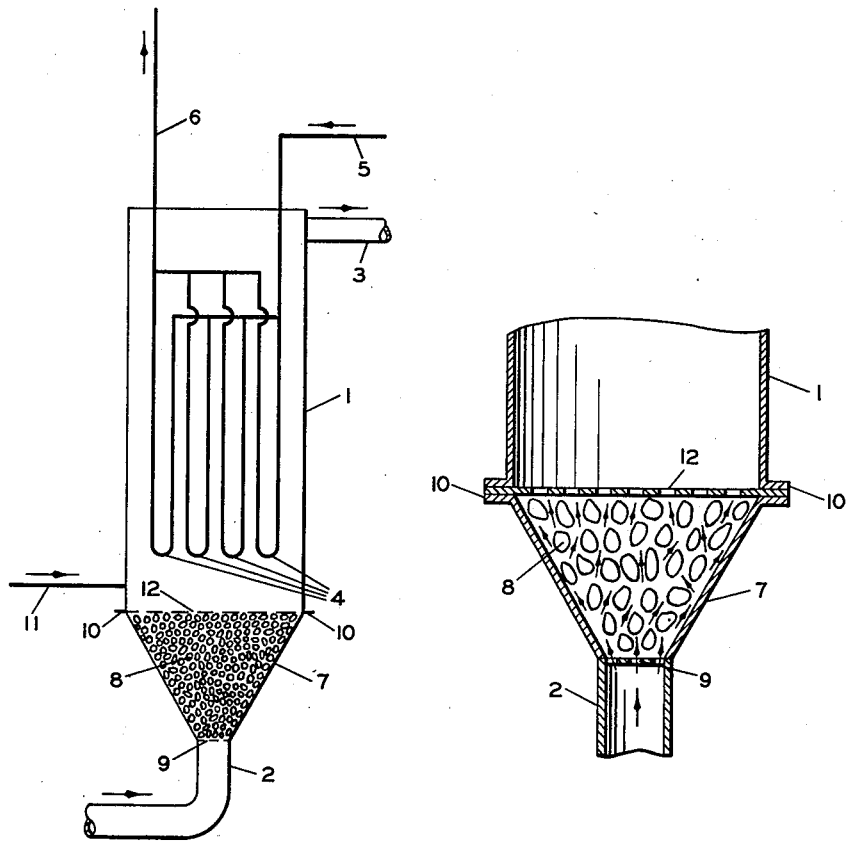

2,654,659

UNITED STATES PATENT OFFICE 2,654,659

DISTRIBUTION FOR INLET GAS

Alvin H. Friedman, Kansas City, Mo., assignor to Phillips Petroleum Company, a corporation of Delaware Application December 18, 1947, Serial No. 792,515

3 Claims. (Cl. 23—288)

This invention relates generally to a process and apparatus for the production of hydrocarbons and more specifically to an improved process and apparatus for distributing the influent gas evenly to the reaction chamber.

This invention is particularly applicable to the catalytic synthesis of hydrocarbons from hydrogen and carbon monoxide in which the "fluidized bed" process is employed. In this type of process, feed gas comprising hydrogen and carbon monoxide is passed into the bottom of an elongated vertical reaction chamber, and flows upwardly through a mass of finely divided catalytic material maintained at an elevated reaction temperature. The velocity of the influent gas maintains the catalytic material in a fluidized and ebullient condition. The influent gas and the reaction products pass through the reaction chamber in opposition to the gravitational force acting upon the catalyst, and as a result, the catalyst assumes a condition of fluidity with the catalyst density greater in the lower portion of the bed than in the upper portion, the effluent gas being relatively catalyst-free.

In order that the "fluidized bed" operations can be carried out at maximum efficiency it is essential that conditions hindering inordinately high rates of conversion be remedied. If the influent gas is not evenly distributed on a horizontal plane within the reaction chamber, regions of stagnant catalyst and channelling of the gas flowing through the catalyst will result and cause a corresponding decrease in the rate of conversion. Poor gas distribution will also cause poor heat distribution with resultant overheating and increased carbonaceous deposits upon the catalyst.

An object of the invention is to provide a means for avoiding undesired conditions within the reaction chamber by making uniform gas distribution possible therein and thus making possible a high degree of contact between the gas and the catalyst while maintaining a high degree of conversion.

In accordance with the present invention, a vertical reactor of the type described is provided with a conical synthesis gas inlet portion, which is filled with inert granular material. Finely divided catalyst is disposed above this material and is separated from the granular material by means of a screen having openings of a suitable size. The feed gas is introduced at the bottom of the reactor through the apex of the cone and flows through the granular layer and is distributed uniformly in an upward direction through the separating screen in a manner which will fluidize the catalyst.

The granular material used to cause the distribution of the influent gas in this invention may be flint, pumice, glass, porcelain, fire-brick, crushed rock, charcoal, or other inert material. It should be catalytically inert for the present reaction, non-fusible, and non-vaporizable under the desired reactor conditions. The particles of the material should be sufficiently dense and coarse to avoid being suspended in the influent gas under operating conditions, and the particles may be spheroidal, cylindrical, or irregular in shape. Generally, a particle size of from 2–12 mesh is satisfactory.

In the accompanying drawing, Figure 1 represents the reaction chamber of a hydrocarbon synthesis process. The synthesis gas is introduced into reactor 1 via inlet 2 and products are removed via outlet 3. Cooling tubes 4 with a water (or other suitable coolant) inlet 5 and outlet 6 are contained within the reactor as a means for controlling the temperature of the reaction by removal of exothermic heat. The reactor is preferably shaped so that its distributing or inlet portion is conical in shape and influent gas enters distributor 7 filled with catalytically inert material 8 which is supported by screen 9 whose mesh size is smaller than the particle size of the inert material in order to hold it in place. In order to permit ready installation of the screen or perforated plate 12 and distributing material 8, the chamber is made in two sections, bolted together at 10. The screen or perforated plate 12 is preferably clamped between the two sections. Catalyst inlet 11 permits fresh or reactivated catalyst to be introduced. Screen 12 keeps the catalyst and the inert material 8 separated and may serve further as a means of support for the catalyst. Its mesh size may be smaller than that of the catalyst to prevent it from becoming mixed with the inert material, but it should at least have a mesh size smaller than the inert material in order to keep said material in place and prevent its being carried into the reaction zone by the velocity of the gas.

Figure 2 is an enlarged elevation of the interior of the distributor portion of the reactor containing the inert granular material 8 and screen 9. The arrows indicate the flow of influent gas within the distributor, and demonstrate the ideal gas distribution afforded by this invention.

An iron catalyst is a preferred catalytic material for the synthesis of hydrocarbons from carbon monoxide and hydrogen by the fluidized method. It is prepared by treating ferric oxide with about ¼ per cent potassium carbonate, and, after fusing and grinding to $65/100$ mesh, it is reduced with hydrogen. I have found that with the use of this type of catalyst, space velocities of 1200 to 5000 volumes of influent gas per volume of catalyst per hour may be utilized. Temperature ranges of 500–750° F. may be used at pressure ranges of 150–250 pounds per square inch. For efficient fluidization of an iron catalyst with a 65/100 mesh size, I have found that the linear velocity of influent gas should preferably be in the range of 0.6–5.5 feet per second. Lower velocities produce catalyst concentrations which are too high for efficient operation, and higher velocities tend to carry the catalyst out of the reactor.

It is obvious that, in order to effect an efficient synthesis at any given set of operating conditions, the gas distribution throughout the reactor is a critical and determining factor. This invention affords a means of achieving an ideal gas distribution and makes possible a high rate of conversion within the reactor.

I claim:

1. Apparatus for the synthesis of hydrocarbons by contacting synthesis gas mixtures comprising carbon monoxide and hydrogen with a finely divided catalyst which comprises an upright, elongated reaction chamber closed at its upper end; a reactant material outlet conduit connected to the upper portion of said chamber; heat exchange means positioned within said chamber; a downwardly and inwardly tapering, conically-shaped distribution chamber attached to and closing the lower end of said reaction chamber; a sole reactant material inlet conduit communicating with the apex of said distribution chamber; a first reticular member positioned between said reaction and distribution chambers for supporting said finely divided catalyst thereabove; a catalyst inlet conduit communicating with the lower portion of said chamber and located above said first reticular member; a second reticular member positioned between said reactant material inlet conduit and said distribution chamber; catalyst inlet means in said chamber above said first reticular member and a fixed mass of granular solid particles inert to the reactants and larger than the openings in said reticular members disposed between said reticular members.

2. Apparatus for the synthesis of hydrocarbons by contacting a gas mixture comprising carbon monoxide and hydrogen with a finely divided catalyst which comprises an upright, elongated reaction chamber closed at its upper end; a product material outlet conduit connected to the upper portion of said chamber; a downward and inward tapering conically-shaped distribution chamber attached to and closing the lower end of said reaction chamber; a sole reactant material inlet conduit communicating with the apex of said distribution chamber; a first reticular member positioned between said reaction and distribution chambers for supporting said finely divided catalyst thereabove; a catalyst inlet conduit communicating with the lower portion of said reaction chamber and located above said reticular member; a second reticular member positioned between said inlet conduit and said distribution chamber; and a fixed mass of granular solid particles inert to the reactants and larger than the openings in said reticular members deposited between said reticular members.

3. Apparatus for the synthesis of hydrocarbons for contacting synthesis gas mixtures comprising hydrogen and carbon monoxide with a finely divided catalyst which comprises an upright, elongated reaction chamber having a downward and inward tapering bottom portion; inlet means for introducing synthesis gas to said reaction chamber at the apex of said bottom portion; a fixed mass of coarse, granular solid particles inert to the reactants in said reaction chamber and supported on the bottom portion and bridged therefrom so as to form a reticular means throughout at least a portion of said tapered bottom chamber portion; a reticular member disposed at the upper surface of said mass of coarse, granular solid particles for supporting said finely divided catalyst thereabove; catalyst inlet means in said chamber above said reticular member; and product outlet conduit means connected to the upper portion of said chamber.

ALVIN H. FRIEDMAN.

References Cited in the file of this patent

UNITED STATES PATENTS

| Number | Name | Date |
|---|---|---|
| 697,807 | Champion | Apr. 15, 1902 |
| 1,857,799 | Winkler | May 10, 1932 |
| 1,984,380 | Odell | Dec. 18, 1934 |
| 1,999,541 | Keller | Apr. 30, 1935 |
| 2,104,858 | Ferguson | Jan. 11, 1938 |
| 2,393,909 | Johnson | Jan. 29, 1946 |
| 2,447,116 | Collins | Aug. 17, 1948 |
| 2,459,444 | Main | Jan. 18, 1949 |
| 2,517,042 | Skelly | Aug. 1, 1950 |

FOREIGN PATENTS

| Number | Country | Date |
|---|---|---|
| 310,686 | Great Britain | May 2, 1929 |
| 526,243 | Great Britain | Sept. 13, 1940 |